Jan. 29, 1935.  P. VERSLUIS  1,989,179
FRICTION BRAKE
Filed Sept. 16, 1933   2 Sheets-Sheet 1

INVENTOR
Peter Versluis,
ATTORNEYS

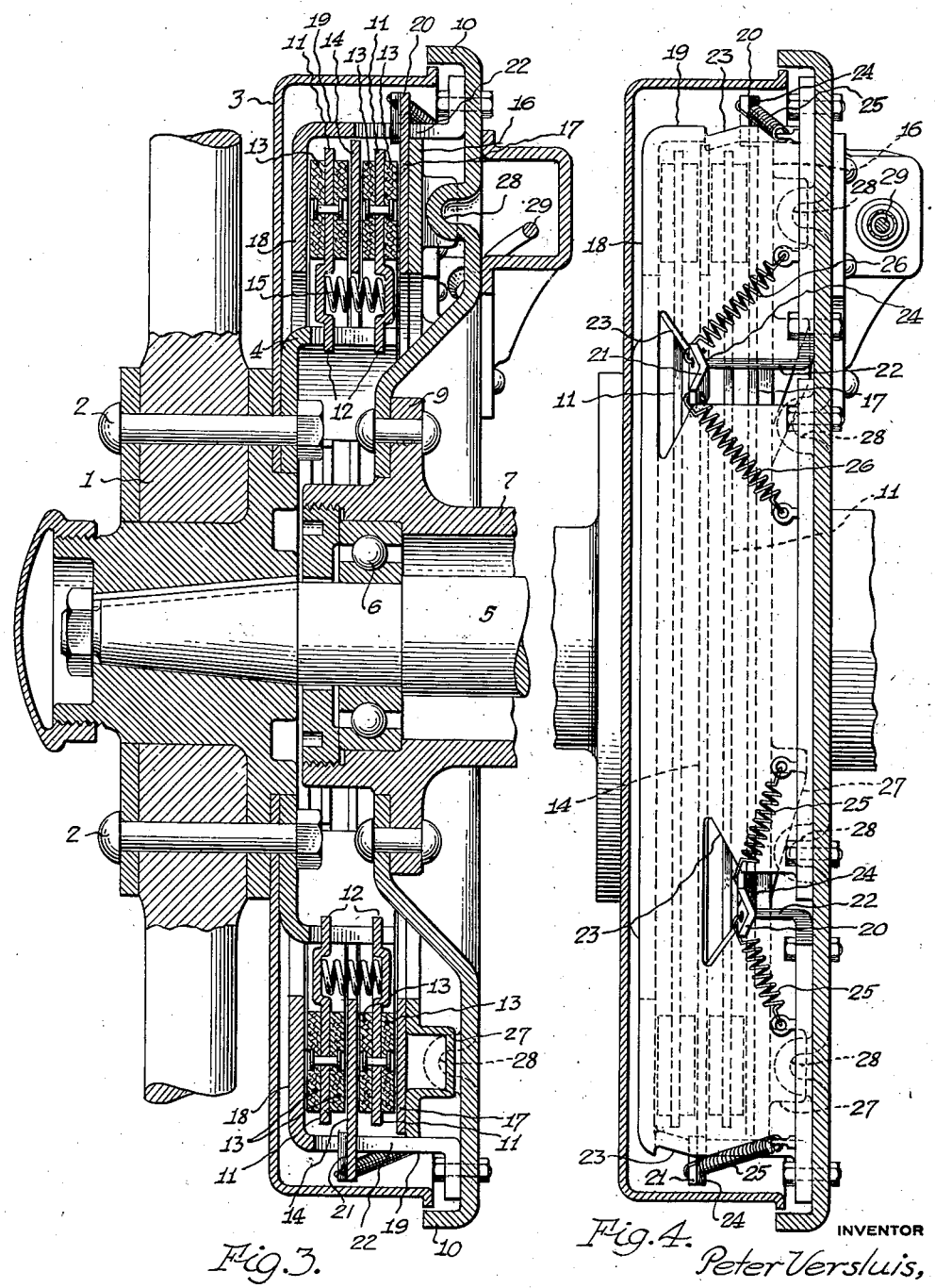

Patented Jan. 29, 1935

1,989,179

UNITED STATES PATENT OFFICE 1,989,179

FRICTION BRAKE

Peter Versluis, Detroit, Mich.

Application September 16, 1933, Serial No. 689,702

12 Claims. (Cl. 188—140)

This invention relates to brakes especially adapted for application to the wheels of motor vehicles but which may be applied to other uses; and its object is to provide a self energizing brake, wherein the setting of the brake is effected through the drag or tendency of a rotative member to impart movement to a fixed member when said members are brought into frictional contact. A further object is to provide simple, compact and efficient means for effecting such self energization, and to provide simple means requiring but a minimum of manual power for bringing these friction members into initial contact with each other, thus relieving the operator of over exertion in effecting efficient operation of the brake.

It is also an object to provide quick, automatically operating means for releasing the brake, which means is embodied within the brake, and the arrangement of which brake mechanism is such that all parts thereof are in compact form and may be enclosed within a suitable casing applicable to a vehicle wheel to protect the mechanism against dirt and dust. Other objects and advantages of the present construction will be apparent from the following description, reference being had to the accompanying drawings, wherein—

Fig. 3 is a transverse axial section of Fig. 1;
and

Fig. 4 is an interior side elevation of Fig. 3 showing the casing and fixed drum disk in section.

Figure 1:
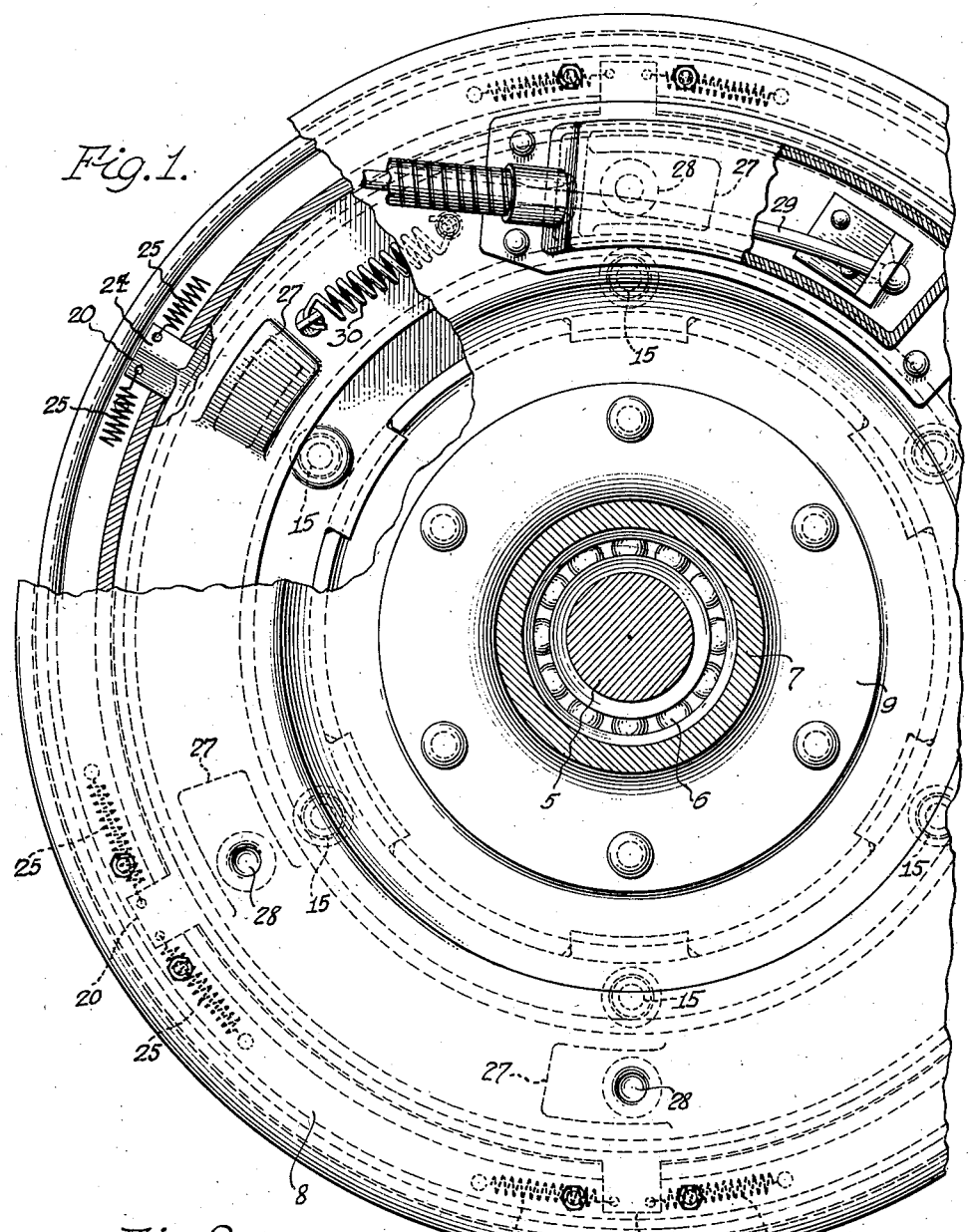
Figure 1 is an elevation of the inner side of a brake illustrative of an embodiment of the present invention with portions broken away and in section to more clearly disclose the construction.
Figure 2:
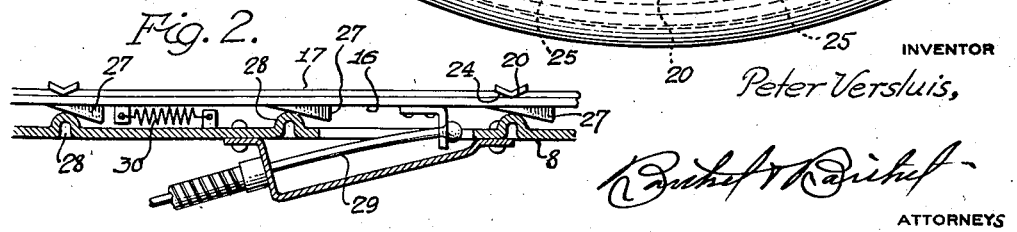
Fig. 2 is a sectional detail showing manually operable means for effecting initial contact between the friction disks or members and also showing in section and edge elevation respectively a fixed drum disk and adjacent fixed friction disk.

As shown in the drawings, the brake is applied to the flanged hub of a motor vehicle wheel 1 by bolts 2 passing through the flange of said hub and through openings in an outer shell or casing 3 and through openings in an inwardly extending flange of a cylindrical rotatable drum 4, whereby said casing and drum are caused to rotate with the wheel which is driven by the usual shaft 5 mounted within a ball bearing 6 secured in the usual manner within the end of the usual fixed axle casing 7.
The inner open side of the casing 3 is closed by a drum disk 8 securely bolted to an outwardly extending flange 9 on the axle 7 adjacent its outer end. This drum disk 8 is formed at its periphery with a laterally extending flange 10 to extend over the adjacent edge of the rotatable casing 3, said disk and casing thus together forming a housing for the interior brake mechanism including the rotatable drum 4.

This interior brake mechanism includes, preferably, a plurality of annular rotatable disks 11 mounted upon the rotatable wheel drum 4 to rotate therewith and to move freely thereon laterally or in a direction longitudinally of said drum, by providing a plurality of longitudinal slots in the drum to receive inwardly extending tongues 12 projecting inwardly from the inner edges of said disks 11. Each of these disks is preferably provided with annular flat rings formed of suitable fibrous friction material secured to opposite sides thereof in any suitable manner adjacent the peripheries of said disks, and interposed between said disks 11 is a fixed annular disk 14, said intermediate fixed disk being normally free of the adjacent friction surfaces 13, said disks 11 being normally urged away from each other and out of contact with the disk 14, by springs 15 seated at their ends in cups or recesses formed in said disks 11 adjacent their inner edge portions.

A master ring 16 is positioned parallel with and adjacent the inner side of the drum disk 8 and positioned in side face contact with said master ring, is a second fixed friction disk 17 adapted to be brought into frictional contact with said friction ring 13 carried by the adjacent side of the adjacent disk 11, by a lateral movement of the master ring 16 away from the drum disk 8, and by further movement of said master ring against the action of said springs 15, said rotatable disks 11 are moved into frictional contact with the fixed disk 14, the friction surface on the outer disk 11 being at the same time brought into frictional contact with an inwardly extending flange or end wall 18 of a fixed drum 19 rigidly bolted to the inner side of the drum disk 8 with the outer cylindrical wall of said fixed drum extending across the peripheries of the disks 14 and 17 and the master ring 16 to hold these disks and ring substantially concentric with the axis of rotation of the drum, they being free to move laterally within this fixed drum.

To connect said fixed disks 14 and 17 to the outer wall of the drum 19 and permit each of said disks but a very limited rotary movement, said disk 17 is formed with a series of peripheral lugs 20, and to hold the disk 14 in a like manner, said disk is formed with a like series of peripheral lugs 21 and these lugs of both disks extend through openings formed in the peripheral wall of said drum, each opening being in the form of a straight portion or slot 22 extending inwardly from the edge of said wall which edge is secured to the drum disk 8 and each of which slots terminates at its opposite end in an enlargement having side edges extending laterally from the side edges of the slot and forming angular or cam portions 23 to be engaged by said lugs after said disks have been moved laterally a sufficient distance to bring them into the enlarged end portions of said slots. Preferably each lug is bent or formed to provide two angular faces 24 to contact the inclines or cams 23, said faces having an inclination corresponding to the inclination of the said sides 23 of said enlarged end portions of said slots and have an extended bearing thereagainst.

To normally and yieldingly hold the disk 17 moved laterally into contact with the master ring 16, springs 25 are attached at one end to each of the lugs 20 and at their opposite ends to the drum disk 8, said springs each extending at substantially right angles to the inclined surfaces of said lugs and thus at substantially right angles to the inclined or cam sides 23 of the enlarged ends of the slots, to hold said lugs in firm contact with said cam edges when said lugs are in engagement therewith; and to yieldingly resist movement of the disk 14 away from the disk 17 and its lugs 21 along the slots 22 and into the enlarged ends thereof, springs 26 similar to said springs 25 arranged in a like manner, are attached to each of said lugs 21.

To positively move by manual force, the master ring 16 toward the several disks and thus bring the fixed disks 14 and 17 into frictional contact with the rotatable disks 11 and frictionally clamp the same between said fixed disks and the fixed wall 18 of the fixed drum 19, said master ring is formed or otherwise provided with a plurality of cam members 27 each having a face inclined in the direction of rotation of said ring, to engage projections 28 formed up from or otherwise provided on the adjacent wall of the drum disk 8, so that upon rotation of said master ring 16 in one direction by means of a flexible pull rod or cable 29 attached at one end to said ring and passing out through an opening in the drum disk, these cams on said ring will come into engagement with said projections and wedge the ring over toward the friction disks thus clamping the same between said ring and the opposite wall 18 of the drum to retard the rotation of the rotatable disks 11 and through their connection with the inner drum 4, retard the rotation of the wheel.

The lugs 20 and 21 normally lie within the straight portions 22 of the slots at a short distance from the enlarged ends of said slots, and therefore a limited lateral movement of the disks 14 and 17 carrying these lugs, will move the lugs out of the straight portions of the drum slots into the enlarged end portions thereof so that these disks may then rotate a limited distance, these lugs moving into contact with either one or the other of the inclined sides 23 of the enlargements, depending upon the direction of rotation of these disks caused by the drag of the rotatable disks 11 engaged thereby. Little effort on the part of the operator is required to rotate the master ring sufficiently to bring the disks into initial frictional contact with the lugs 20 and 21 into contact with the inclined sides 23 of said slots, when the rotative drag upon these fixed disks will cause their lugs to ride outwardly along these inclines, and due to such inclination of said sides of said slots, will wedge these disks laterally into further frictional contact with the rotatable disks carried by the wheel drum 4, and thus automatically set the brake, the retarding effect of which will be proportionate to the drag and the amount of this drag will be determined by the length of time the fixed disks are caused to remain in the position with their lugs within the enlarged ends of the slots, this being determined by the operator holding the master ring in its rotated position against the action of a spring or springs 30 attached at one end to said ring and at its opposite end to the drum disk 8 to act in a direction opposite to the pull of the flexible rod 29 which may be extended to any desired point and attached to a foot pedal (not shown).

Immediately upon release of the pull rod 29, the master ring will be rotated by its spring 30 to release the lateral pressure of the said ring against the disk 17, which will release frictional contact with the rotatable disks, and the springs 25 and 26 will immediately act to draw the fixed disks laterally and move their lugs 20—21 out of contact with the inclined sides of the slots and into the straight portions thereof, thus immediately stopping this automatic action or drag of the rotating disks upon the fixed disks to fully energize the brake. A lateral movement of the disks sufficient to bring them into limited frictional contact and sufficient to move the lugs 20 and 21 past the shoulder formed by the meeting of the side of the straight portions of the slot and the inclined side of the enlargement thereof, will therefore make the brake self-energizing so that no effect on the part of the operator will be required, due to the drag, to bring the disks into full frictional contact, and this will be true regardless of the direction of rotation of the wheel as the enlarged ends of the slots have inclined sides extending laterally from both sides of the straight portions. This mechanism will, therefore act the same upon both forward and backing up motion of the vehicle, and a manual force will be required which is only sufficient to effect an initial frictional contact between the disks, and this initial contact will be sufficient, without bringing the drag effect into operation, to only slightly retard the vehicle when so desired, or give what is known as a snubbing action.

Obviously an arrangement other than that of the springs 15, 25 and 26 as shown, may be employed to normally hold the friction members separated and other means than the master ring and cams as shown may be used for effecting initial contact between the disks. Obviously other changes in the arrangement and combination of elements may be employed without departing from the spirit of my invention, and I do not, therefore, limit myself to the particular construction shown.

Having thus fully described my invention, what I claim is:—

1. A brake including a member for attachment to a member to be retarded in its rotation, a laterally movable rotative disk having operative connection with said member to turn therewith, a fixed drum to be frictionally contacted by said rotative disk when said disk is moved laterally, a friction disk connected to said drum by means comprising a peripheral projection on said disk to engage within the angle between divergent surfaces on said drum extending angularly to the plane of rotation of said rotatable disk, said disk having limited rotative movement relative to said drum, and means for effecting an initial frictional contact between said disks, said limited rotation of said disk relative to said drum being effected by said initial frictional contact of said disks to move said disks into further frictional contact.

2. A brake including a drum for attachment to and rotatable with a member to be retarded in its rotation, a friction disk mounted upon and operatively connected to said drum to turn therewith and free to move laterally, a fixed drum opposed to one side of said disk, a retarding friction disk opposed to the other side of said laterally movable disk and connected to and having limited rotation relative to said fixed drum, and manually operable means for moving said disks laterally into initial frictional contact with each other and with said fixed drum, said connection between said fixed drum and retarding disk comprising a projecting portion on one of said members to engage within the angle between divergent surfaces on the other of said members, which surfaces are inclined to the plane of rotation of said first named friction disk to move said retarding disk into further frictional contact with said rotative disk upon said limited rotation of said disk relative to said fixed drum by its initial contact with said rotative disk.

3. A brake including a friction disk to rotate with a member to be retarded in its rotation, a fixed drum having a slot therein longitudinally thereof, a friction disk to engage said rotatable disk and having means to engage said slot, and means for moving said disks into initial frictional contact, said slot being formed to permit a limited rotative movement of said disk relative to said drum and to move said disk into further frictional contact with said rotatable disk upon such limited rotation caused by said initial contact between said disks.

4. A friction brake including a friction disk for connection with a member to be retarded in its rotation to rotate therewith, a non-rotative member formed with divergent surfaces oppositely inclined and to the plane of rotation of said rotatable disk, a second friction disk having a limited rotative movement and arranged to contact with either of said inclined surfaces, and means for effecting initial contact between said disks, limited rotation in either direction of said second disk in contact with either of said inclined surfaces of said non-rotative member being effective to move said disks into further frictional engagement.

5. A brake including a friction disk for connection with a member to be retarded in its rotation to rotate therewith, a non-rotatable drum having an opening therein formed with a side inclined in the direction of rotation of said rotatable disk, a second friction disk formed with a lug to engage within said opening and contact said inclined side to effect contact between said disks upon limited rotation of said second disk, and means for moving said disks relatively to effect initial frictional contact therebetween.

6. A brake including a friction disk for connection with a member to be retarded in its rotation to rotate therewith, a non-rotatable drum formed with a longitudinal slot having a straight side portion and a side portion inclined in the direction of rotation of said rotatable disk, a second disk having a peripheral lug to engage said slot, means for effecting initial contact between said disks, and means for moving said second disk away from said rotatable disk to move said lug along said slot out of contact with said inclined portion thereof into contact with said straight portion.

7. A brake including a rotatable drum, a plurality of rotatable friction disks operatively connected to said drum to rotate therewith and to move laterally along said drum, a non-rotatable drum formed with a plurality of longitudinal openings having straight side portions and side portions meeting said straight portions at an inclination thereto, a plurality of friction disks having limited rotative movement alternating with said rotatable disks and each formed with peripheral lugs to engage within said openings, means for moving said disks laterally to effect initial frictional contact between said disks and move said disks having limited rotative movement, to move said lugs from contact with said straight portions of said openings into contact with said inclined portions thereof, and means for moving said disks out of frictional contact with each other with said lugs engaging said straight portions of said openings.

8. A brake as characterized in claim 6 and wherein said means for effecting initial contact between said non-rotatable drum includes an inwardly extending end wall at one side of said disks and said means for effecting initial contact between said disks includes a master ring at the other side of said disks with means for moving said ring toward the adjacent disk.

9. A brake as characterized in claim 7 and wherein said rotatable drum is formed with longitudinal slots to receive lugs on the inner sides of said rotatable disks and said non-rotatable drum has an inwardly extending end wall at one side of said disks, and wherein said means for moving said disks laterally to effect initial contact between said disks includes a master ring at the other side of said disks with means for moving said ring laterally toward said disks, and yieldable means for moving said disks in a lateral direction opposite to that in which they are moved by said ring.

10. A brake comprising an inner rotatable drum for attachment to a member to be retarded in its rotation, a plurality of annular rotative disks mounted upon said drum to rotate therewith and to move laterally longitudinally of said drum, a plurality of annular friction disks alternating with said rotative disks and each having a limited rotative movement, an outer non-rotative drum having a cylindrical wall portion extending across the peripheries of said disks and an inwardly extending end wall at one side of said disks, said cylindrical fixed drum wall being formed with longitudinally extending slots terminating in enlarged ends with said ends formed with sides extending at an inclination in the direction of rotation of said rotatable disks and meeting the parallel sides of said slots at angles thereto, each of said disks of limited rotation having peripheral lugs to engage said slots, each of said lugs having angular faces to engage the inclined sides of the enlarged ends of said slots, a master ring at the side of said disks opposite that at which said end wall of said non-rotatable drum is located, means for manually moving said ring toward the adjacent disk to move said disks into initial contact, and yieldable means for moving said disks toward said ring.

11. A brake including a friction member for connection with a member to be retarded in its rotation, to rotate therewith; a non-rotatable member provided with surfaces, one inclined in one direction to the plane of rotation of said rotatable member and another inclined in an opposite direction; a retarding friction member to engage and retard said rotatable friction member in its rotation and having limited rotative movement relative to said non-rotative member and arranged to engage one of said inclined surfaces when rotated in one direction relative to said fixed member, and to engage another of said surfaces when rotated in an opposite direction; and means for rotating said retarding friction member to bring it into initial engagement with one of said inclined surfaces; whereby further frictional engagement between said friction members in either direction of rotation, is aided by relative rotation of said members caused by initial engagement.

12. A brake including a friction member for connection with a member to be retarded in its rotation, to rotate therewith; a non-rotatable member provided with surfaces, one inclined in one direction to the plane of rotation of said rotatable member and another inclined in an opposite direction; a retarding friction member to engage and retard said rotatable friction member in its rotation and having limited rotative and lateral movement relative to said non-rotative member; means on said retarding member to engage one of said inclined surfaces in either direction of rotation of said member; means for yieldingly holding said retarding member moved laterally with said means thereon at the adjacent ends of said diverging surfaces; and means for moving said retarding member into initial frictional engagement with said rotatable friction member and with said means engaged with one of said inclined surfaces, whereby further frictional engagement between said members is aided in either direction of rotation by relative rotation of said members.

PETER VERSLUIS